US010186351B1

United States Patent
Hunt et al.

(10) Patent No.: US 10,186,351 B1
(45) Date of Patent: Jan. 22, 2019

(54) TOPOLOGICAL INSULATOR TUBES APPLIED TO SIGNAL TRANSMISSION SYSTEMS

(71) Applicant: The Boeing Company, Chicago, IL (US)

(72) Inventors: Jeffrey H. Hunt, Thousand Oaks, CA (US); Wayne R. Howe, Irvine, CA (US); Angela W. Li, Everett, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/815,609

(22) Filed: Nov. 16, 2017

(51) Int. Cl.
*H01B 17/00* (2006.01)
*G02B 6/02* (2006.01)
*G02B 6/46* (2006.01)
*H01B 17/58* (2006.01)

(52) U.S. Cl.
CPC ....... *H01B 17/005* (2013.01); *G02B 6/02004* (2013.01); *G02B 6/0229* (2013.01); *G02B 6/02319* (2013.01); *G02B 6/46* (2013.01); *H01B 17/58* (2013.01)

(58) Field of Classification Search
CPC .............. G02B 6/02004; G02B 6/0229; G02B 6/02319; G02B 6/46; H01B 17/005; H01B 17/58
USPC ........................................................ 385/141
See application file for complete search history.

(56) References Cited

U.S. PATENT DOCUMENTS

| 5,508,489 | A  | 4/1996  | Benda et al. |
| 6,815,636 | B2 | 11/2004 | Chung et al. |
| 7,515,986 | B2 | 4/2009  | Huskamp |
| 9,086,522 | B1 | 7/2015  | Li et al. |
| 9,086,523 | B2 | 7/2015  | Li et al. |
| 9,296,007 | B2 | 3/2016  | Li et al. |
| 9,630,209 | B2 | 4/2017  | Hunt et al. |
| 9,632,542 | B2 | 4/2017  | Li et al. |
| 9,732,418 | B2 | 8/2017  | Li et al. |
| 2010/0140723 | A1 | 6/2010 | Kurtz et al. |

(Continued)

FOREIGN PATENT DOCUMENTS

WO    WO 2013/086227 A1    6/2013

OTHER PUBLICATIONS

Ando et al., "Topological Insulator Materials," Journal of the Physical Society of Japan, Invited Review Papers, 2013, pp. 1-36.

(Continued)

*Primary Examiner* — Jerry Blevins
(74) *Attorney, Agent, or Firm* — MH2 TECHNOLOGY LAW GROUP LLP (57) ABSTRACT

A system for providing electrical and optical interconnection using a 3D non-carbon-based topological insulator (TI) is disclosed. The system includes a length of the TI having a tube shape having wall thickness of about 10 nm to about 200 nm and a hollow interior portion surrounded by an interior surface of the TI. The length includes a first end and a second end, wherein the first end is configured to receive an optical signal, an electrical signal, or both. The optical signal propagates in the hollow interior portion along the length to the second end by total internal reflection due to a refractive index of the interior surface of the TI. The electrical signal propagates along an external surface of the TI to the second end.

19 Claims, 10 Drawing Sheets

(56) References Cited

U.S. PATENT DOCUMENTS

| | | | |
|---|---|---|---|
| 2012/0138887 A1* | 6/2012 | Zhang | H01F 1/401 257/9 |
| 2014/0199542 A1 | 7/2014 | Li et al. | |
| 2015/0165556 A1 | 6/2015 | Jones et al. | |
| 2015/0174695 A1 | 6/2015 | Elfstroem et al. | |
| 2015/0255184 A1 | 9/2015 | Li et al. | |
| 2015/0257308 A1 | 9/2015 | Li et al. | |
| 2016/0082617 A1 | 3/2016 | Howe et al. | |
| 2016/0116679 A1 | 4/2016 | Muendel et al. | |
| 2016/0158889 A1 | 6/2016 | Carter et al. | |
| 2016/0168692 A1 | 6/2016 | Li et al. | |
| 2017/0090119 A1 | 3/2017 | Logan et al. | |
| 2017/0173737 A1 | 6/2017 | Gray | |
| 2017/0306476 A1 | 10/2017 | Li et al. | |

OTHER PUBLICATIONS

Hasan et al., "Colloquium: Topological Insulators," The Amer. Phys. Soc., Reviews of Modern Physics, vol. 82, Oct.-Dec. 2010, pp. 3045-3067.

Hills et al., "From Graphene and Topological Insulators to Weyl Semimetals," WSPC/Instruction File, 2015, pp. 1-33.

Hla, "Single Atom Extraction by Scanning Tunneling Microscope Tip-Crash and Nanoscale Surface Engineering," Nanoscale & Quantum Phenomena Institute, Physics & Astronomy Department, Ohio University, Athens, OH, date unknown, pp. 1-15.

Hla, "STM Single Atom/Molecule Manipulation and Its Application to Nanoscience and Technology," Critical Review article, J. Vac. Sci. Tech, 2005, p. 1-12.

Khanikaev et al., Photonic Topological Insulators, Nature Materials, vol. 12, Mar. 2013, pp. 233-239.

Kong et al., "Opportunities in Chemistry and Materials Science for Topological Insulators and Their Nanostructures," Nature Chemistry, vol. 3, Nov. 2011, pp. 845-849.

Kuzmenko et al., Universal Dynamical Conductance in Graphite, *DPMC, University of Geneva*, Switzerland, 2007, pp. 1-5.

Li et al., "Marginal Topological Properties of Graphene: a Comparison with Topological Insulators," *DPMC, University of Geneva*, Switzerland, 2012, pp. 1-9.

Mak et al., "Optical Spectroscopy of Graphene: From the Far Infrared to the Ultraviolet," Solid State Communications, 152 (2012), 1341-1349.

Mingareev et al., "Laser Additive Manufacturing Going Mainstream," Optics and Photonics News, Feb. 2017, 8 pages.

Moore, "The Birth of Topological Insulators," Nature, vol. 464, Insight Perspective (2010), pp. 194-198.

Peng et al., "Topological Insulator Nanostructures for Near-Infrared Transparent Flexible Electrodes," Nature Chemistry, vol. 4, Apr. 2012, pp. 281-286.

Qi et all, "Topological Insulators and Superconductors," arXiv:1008.2026v1 [cond-mat.mes-hall], (2010), pp. 1-54.

Zhang, "Viewpoint: Topological States of Quantum Matter," American Physical Society, Physics 1, 6 (2008), 3 pages.

Zhu et al., "Optical Transmittal of Multilayer Graphene," EPL, 108 (2014) 17007, 4 pages.

Gu, "Chapter 2—Laser Additive Manufacturing (AM): Classification, Processing Philosophy, and Metallurgical Mechanisms," Laser Additive Manufacturing of High-Performance Materials, 2015, XVII, pp. 15-24.

Wikipedia, Graphene, https://en.wikipedia.org/wiki/Graphene, 29 pages, downloaded Nov. 15, 2017.

Wikipedia, Scanning Tunneling Microscope, https://en.wikipedia.org/wiki/Scanning_Tunneling_Microscope, 9 pages.

Wikipedia, "Nanometre," https://en.wikipedia.org/wiki/Nanometre, 2 pages.

Wikipedia, "Carbon Nanotube," https://en.wikipedia.org/wiki/Carbon_Nanotube, 22 pages.

* cited by examiner

TOPOLOGICAL INSULATOR TUBES APPLIED TO SIGNAL TRANSMISSION SYSTEMS

FIELD

This disclosure relates generally topological insulators.

BACKGROUND

Cabling for optical communication and electrical conduction have typically been provided by different systems composed of different materials. For example, fiber optic cables transmit light, but cannot conduct electricity without conductive coatings. Electrical wire composed of materials, such as copper or aluminum, conduct electricity, but cannot transmit information at Gigabit and Terabit speeds like fiber-optic cable due to capacitive effects that limit high bit rates. Based on these constraints, most avionic systems and/or other network and communication systems presently use hybrid systems that contain both physical implementations, increasing airframe, other platform, and/or ground systems' size, weight, and power (SWAP) and complexity.

What is needed is an optical and electrical coupling that overcomes the above-noted deficiencies.

SUMMARY

In accordance with examples of the present disclosure, a system for providing electrical and optical interconnection using a 3D non-carbon-based topological insulator (TI) is disclosed. The system comprises a length of the TI having a tube shape having wall thickness of about 10 nm to about 200 nm and a hollow interior portion surrounded by an interior surface of the TI, wherein the length comprises a first end and a second end, wherein the first end is configured to receive an optical signal, an electrical signal, or both, the optical signal configured to propagate in the hollow interior portion along the length to the second end by total internal reflection due to a refractive index of the interior surface of the TI, the electrical signal configured to propagate along an external surface of the TI to the second end.

In some examples, the TI provides both electrical power levels of about 100 mW and optical data rates of about 0.1 to about 1 Gb/s at the same time.

In some examples, the TI comprises $Bi_2Se_3$, BiSb, BiTe, SbTe, HgTe, or CdTe.

In some examples, the system further comprises an insulating cladding surrounding the length of the TI.

In some examples, the insulating cladding comprises $Bi_2Se_3$, BiSb, BiTe, SbTe, HgTe, or CdTe.

In some examples, the system further comprises one or more additional lengths of non-carbon-based TI, each of which surrounding by corresponding cladding.

In some examples, the system further comprises another cladding surrounding the length and the one or more additional lengths.

In some examples, the system further comprises a magnet configured to provide a magnetic field in a direction transverse to the length of the TI such that a current is produced along the external surface of the length of the TI that flows in a direction from the first end to the second end.

In some examples, the system further comprises a first transceiver configured to provide the electrical signal, the optical signal, or both to the first end of the length of the TI.

In some examples, the system further comprises a second transceiver configured to receive the electrical signal, the optical signal, or both from the second end of the length of the TI.

In accordance with examples of the present disclosure, a method for providing electrical and optical interconnection using a 3D non-carbon-based topological insulator (TI) having length and a tube shape having wall thickness of about 10 nm to about 200 nm and a hollow interior portion surrounded by an interior surface of the TI is disclosed. The method comprises providing an electrical signal from an electrical transmitter to an external surface of a first end of the TI; providing an optical signal from an optical transmitter to a hollow interior portion of the first end of the TI; obtaining the electrical signal from an electrical receiver from the external surface of a second end of the TI; and obtaining the optical signal from an optical receiver from the hollow interior portion of the second end of the TI, wherein the optical signal is configured to propagate in the hollow interior portion along the length to the second end by total internal reflection due to a refractive index of an interior surface of the TI and the electrical signal is configured to propagate along the external and/or internal surface of the TI to the second end. In some examples, the TI provides both electrical power levels of about 100 mW and optical data rates of about 0.1 to about 1 Gb/s at the same time. In some examples, the TI comprises $Bi_2Se_3$, BiSb, BiTe, SbTe, HgTe, or CdTe. In some examples, the TI further comprises an insulating cladding surrounding the length the TI. In some examples, the insulating cladding comprises $Bi_2Se_3$, BiSb, BiTe, SbTe, HgTe, or CdTe. In some examples, the method further comprises providing a magnet field in a direction transverse to the length of the TI such that a current is produced along the external surface of the length of the TI that flows in a direction from the first end to the second end.

In accordance with examples of the present disclosure, a transmission system is provided. The transmission system comprises a first transceiver; a second transceiver; and a length of 3D non-carbon-based topological insulator (TI) configured to connect the first transceiver and the second transceiver and configured to provide an electrical and optical interconnection between the first transceiver and the second transceiver.

BRIEF DESCRIPTION OF THE DRAWINGS

Various features of the examples can be more fully appreciated, as the same become better understood with reference to the following detailed description of the examples when considered in connection with the accompanying figures, in which.

DETAILED DESCRIPTION

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown byway of illustration specific examples in which the disclosure may be practiced. These examples are described in sufficient detail to enable those skilled in the art to practice the disclosure and it is to be understood that other implementations may be utilized and that changes may be made without departing from the scope of the disclosure. The following description is, therefore, merely exemplary.

Individual atoms have quantized discrete energy levels which are occupied by each individual atom's electrons. In the case of a solid, however, many atoms are in close proximity to one another and the discrete energy levels of the individual atoms combine to form so-called "energy bands." These energy bands are defined by energies that can be determined by spectroscopically measuring the bandgap in the solid, for example, according to known spectroscopic methods, such as wavelength modulation spectroscopy. Generally, photons having energy values that lie below the bandgap will transmit through the solid while photons having energy values at or above the bandgap will be strongly absorbed. In wavelength modulation spectroscopy, the relative absorption of the photons is correlated with the band density of states.

The energy bands describe electron behavior within the solid. For example, in these energy bands, electron energy can be described as a function of the electron's wave-vector as the electron travels through the solid. Macroscopic behavior of many electrons in the solid—electrical conductivity, thermal conductivity, and the like—result from the band structure. Ordinarily, the geometric construction of solids do not have an effect on the band structure. However, for very thin solids such as graphene, not only does the solid's geometry change but so too does its band structure. That is, for thin solids, the electron behavior changes as the geometry of the solid changes. Thus, whether a solid is a defined as a "2D-" or "3D-structure" depends on the solid's band structure. For example, graphene is monoatomic and its 2D band structure only exists when it is one atomic layer thick. The addition of more atomic layers (i.e., from single-layer graphene to few-layer graphene) not only increases graphene's thickness, but also changes its band structure toward its 3D configuration. In contrast, topological insulators comprise several different atoms and can be molecularly engineered. Thus, unlike graphene which faces the aforementioned issues to changes in its band structure, a topological insulator largely maintains its 2D band structure even as the material's thickness is changed.

A topological insulator is a material with non-trivial topological order that behaves as an insulator in its interior but whose surface contains conducting states, meaning that electrons can only move along the surface of the material. However, having a conducting surface is not unique to topological insulators, since ordinary band insulators can also support conductive surface states. What is special about topological insulators is that their surface states are symmetry protected by particle number conservation and time reversal symmetry.

In the bulk of a non-interacting topological insulator, the electronic band structure resembles an ordinary band insulator, with the Fermi level falling between the conduction and valence bands. On the surface of a topological insulator there are special states that fall within the bulk energy gap and allow surface metallic conduction. Carriers in these surface states have their spin locked at a right-angle to their momentum (spin-momentum locking). At a given energy the only other available electronic states have different spin, so the "U"-turn scattering is strongly suppressed and conduction on the surface is highly metallic. Non-interacting topological insulators are characterized by an index (known as $Z_2$ topological invariants) similar to the genus in topology.

The "protected" conducting states in the surface are required by time-reversal symmetry and the band structure of the material. The states cannot be removed by surface passivation if it does not break the time-reversal symmetry, which does not happen with potential and/or spin-orbit scattering, but happens in case of true magnetic impurities (e.g. spin-scattering).

Provided herein is a 3D non-carbon-based topological insulator nanotube and a use of the 3D non-carbon-based topological insulator nanotube for the simultaneous transmissions of optical and electrical signals. In some examples, the nanotube can have a diameter between about 10 nm to about 10 μm. A hollow tube of the 3D non-carbon-based topological insulator, with a higher refractive index than air, allows it to act like a hollow core optical fiber. The very low electrical resistivity, particularly at low temperatures, allows it to act like a high conductivity wire. This system employs the properties of topological insulator based nanotubes to simultaneously act like both an optical fiber and electrical wire. The benefit is lightweight electrical power and optical communications capability on airplanes or other platforms, and/or ground-based communications systems with size, weight, and/or power constraints.

As used herein, the term "topological insulator" means a two-dimensional ("2D") or three-dimensional ("3D") material with time-reversal symmetry and topologically protected edge states (2D) or surface states (3D). For example, a 2D topological insulator generally will not conduct current across the surface of the 2D material, but can carry current along the edges of the 2D material. In another example, a 3D topological insulator generally will not conduct current through the bulk of the 3D material, but may carry current along the surface of the 3D material.

As used herein, the term "non-carbon-based topological insulator" means a topological insulator whose crystal structure does not include carbon.

Some 2D, non-carbon-based topological insulators comprise, for example, one or more of antimony (Sb), bismuth (Bi), selenium (Se), or tellurium (Te).

Some 2D, non-carbon-based topological insulators can include, but are not limited to, CdTe/HgTe/CdTe quantum wells, AlSb/InAs/GaSb/AlSb quantum wells, Bi bilayers, monolayer low-buckled HgSe, monolayer low-buckled HgTe, strained HgTe, and silicene.

Some 3D, non-carbon-based topological insulators comprise, for example, one or more of antimony (Sb), bismuth (Bi), selenium (Se), or tellurium (Te).

The at least one non-carbon-based topological insulator can include, but are not limited to, one or more of $Bi_{1-x}Sb_x$ ($0<x<1$) (e.g., $Bi_{0.9}Sb_{0.1}$), $Bi_{1-x}Te_x$ ($0<x<1$), $Bi_{1-x}Te_x$ ($0<x<1$), Sb, $Bi_2Se_3$, $Bi_2Te_3$, $Sb_2Te_3$, $Bi_2Te_2Se$, $(Bi,Sb)_2Te_3$ (e.g., $(Bi_{0.2}Sb_{0.8})_2Te_3$), $Bi_{2-x}Sb_xTe_{3-y}Se_y$ ($0\leq x\leq 2$; $0\leq y\leq 3$), $Bi_{2-x}Sb_xTe_{3-y}Se_y$ ($0\leq x\leq 2$; $1\leq y\leq 3$) (e.g., $Bi_2Te_{1.95}Se_{1.05}$, $BiSbTe_{1.25}Se_{1.75}$), $Bi_2Te_{1.6}S_{1.4}$, $Bi_{1.1}Sb_{0.9}Te_2S$, $Sb_2Te_2Se$, $Bi_2(Te,Se)_2(Se,S)$, $TlBiSe_2$, $TlBiTe_2$, $TlBi(S_{1-x}Se_x)_2$ ($0.5\leq x\leq 1$), $Pb(Bi_{1-x}Sb_x)_2Te_4$ ($0\leq x\leq 1$), $PbBi_2Te_4$, $PbSb_2Te_4$, $PbBi_4Te_7$, $GeBi_2Te_4$, $GeBi_{4-x}Sb_xTe_7$ ($0\leq x\leq 4$), $(PbSe)_5(Bi_2Se_3)_3$, $(PbSe)_5(Bi_2Se_3)_6$, $(Bi_2)(Bi_2Se_{2.6}S_{0.4})$, $Bi_4Se_3$, $Bi_4Se_{2.6}S_{0.4}$, $(Bi_2)(Bi_2Te_3)_2$, SnTe, $Pb_{1-x}Sn_xSe$ ($0<x<1$), $Pb_{1-x}Sn_xTe$ ($0<x<1$), $Pb_{0.77}Sn_{0.23}Se$, $Bi_{1.84-x}Fe_{0.16}Ca_xSe_3$ ($0\leq x<1.84$), $Cr_{0.08}(Bi_{0.1}Sb_{0.9})_{1.92}Te_3$, $(Dy_xBi_{1-x})_2Te_3$ ($0<x<1$), $Ni_xBi_{2-x}Se_3$ ($0<x<2$), $(Ho_xBi_{1-x})_2Se_3$ ($0\leq x<1$), $Ag_2Te$, $SmB_6$, $Bi_{14}Rh_3I_9$, $Bi_{2-x}Ca_xSe_3$ ($0<x<2$), $Bi_{2-x}Mn_xTe_3$ ($0<x<2$) (e.g., $Bi_{1.91}Mn_{0.09}Te_3$, $Bi_{1.96}Mn_{0.04}Te_3$, $Bi_{1.98}Mn_{0.02}Te_3$), $Ba_2BiBrO_6$, $Ba_2BiIO_6$, $Ca_2BiBrO_6$, $Ca_2BiIO_6$, $Sr_2BiBrO_6$, or $Sr_2BiIO_6$.

Potential dopants for topological insulators include, for example, semiconductors, rare earth elements, transition metals, and/or other elements. Such semiconductors can include, for example, germanium ("Ge"), silicon ("Si"), and silicon-germanium alloys (e.g., $Si_{1-x}Ge_x$ ($0<x<1$)). Such rare earth elements can include, for example, cerium ("Ce"), dysprosium ("Dy"), erbium ("Er"), europium ("Eu"), gadolinium ("Gd"), holmium ("Ho"), lanthanum ("La"), lutetium ("Lu"), neodymium ("Nd"), praseodymium ("Pr"), promethium ("Pm"), samarium ("Sm"), scandium ("Sc"), terbium ("Tb"), thulium ("Tm"), ytterbium ("Yb"), and yttrium ("Y"). Such transition metals can include, for example, bohrium ("Bh"), cadmium ("Cd"), chromium ("Cr"), cobalt ("Co"), copernicium ("Cn"), copper ("Cu"), darmstadtium ("Ds"), dubnium ("Db"), gold ("Au"), hafnium ("Hf"), hassium ("Hs"), iridium ("Ir"), iron ("Fe"), manganese ("Mn"), meitnerium ("Mt"), mercury ("Hg"), molybdenum ("Mo"), nickel ("Ni"), niobium ("Nb"), osmium ("Os"), palladium ("Pd"), platinum ("Pt"), rhenium ("Re"), rhodium ("Rh"), roentgenium ("Rg"), ruthenium ("Ru"), rutherfordium ("Rf"), seaborgium ("Sg"), silver ("Ag"), tantalum ("Ta"), technetium ("Tc"), titanium ("Ti"), tungsten ("W"), vanadium ("V"), zinc ("Zn"), and zirconium ("Zr"). Such other elements can include, for example, antimony ("Sb"), calcium ("Ca"), magnesium ("Mg"), oxygen ("O"), strontium ("Sr"), and tin ("Sn").

The doping can comprise, for example, interstitial doping of a crystal structure of at least one 2D or 3D, non-carbon-based topological insulator. Such doping can break the time-reversal symmetry of the at least one 2D or 3D, non-carbon-based topological insulator. $Bi_2Se_3$ can be doped, for example, with one or more of Ca, Cr, Cu, Dy, Fe, Gd, Ho, Mg, Mn, Ni, Sb, or Sm (e.g., $Bi_{1.84-x}Fe_{0.16}Ca_xSe_3$ ($0\leq x<1.84$), $(Ho_xBi_{1-x})_2Se_3$ ($0\leq x\leq 0.21$)). $Bi_2Te_3$ can be doped, for example, with one or more of Cr, Dy, Fe, Gd, Ho, Mn, Sb, Sm, or Sn (e.g., $Cr_{0.08}(Bi_{0.1}Sb_{0.9})_{1.92}Te_3$, $(Dy_xBi_{1-x})_2Te_3$ ($0<x<1$)). $Sb_2Te_3$ can be doped, for example, with one or both of Cr or Mn. $(Bi,Sb)_2Te_3$ can be doped, for example, with one or both of Cr or V.

Topological insulators and other minimal-molecule thickness materials are formed in small tubes with good indexes of refraction and conductive qualities that can supply both electrical power and high optical data rates at the same time with very low size and weight. Topological insulators in a tube form provides a good index of refraction to conduct light/photons, and because of the electrical "skin effect" on both the inside and outside of the tube, it provides extremely low resistance due to the high surface area per topological insulator molecule. In the context of conductive surfaces, the concept of "skin" can be explained as follows. In principle, even if a material is opaque, that the evanescent wave will penetrate into the opaque material a distance on the order of the wavelength of the light in question. But in conductive media, the evanescent wave will drop off much more quickly and not penetrated into the material at all, which is known as a "skin effect. In addition, topological insulators may also be configured to have resistive or semiconductor properties. This results in extremely small (i.e., nanotube diameters with molecular dimensions), extremely lightweight material for high efficiency light/photon transmission and extremely high electrical/electron conductance (extremely low resistance), and can also be configured for high resistivity and semiconductor properties. In some example, the physical dimensions of the nanotube can have a diameter as small as 10 nm, with numbers up to 10 micron still being considered "small." The term "light weight" derives from the fact that, because of the geometry, the nanotube is mostly empty space. Lightweight can be considered to be really low-density. One benefit is lightweight electrical power and optical communications capability on airplanes or other platforms, or ground-based systems with size, weight, and/or power constraints.

Figure 1:
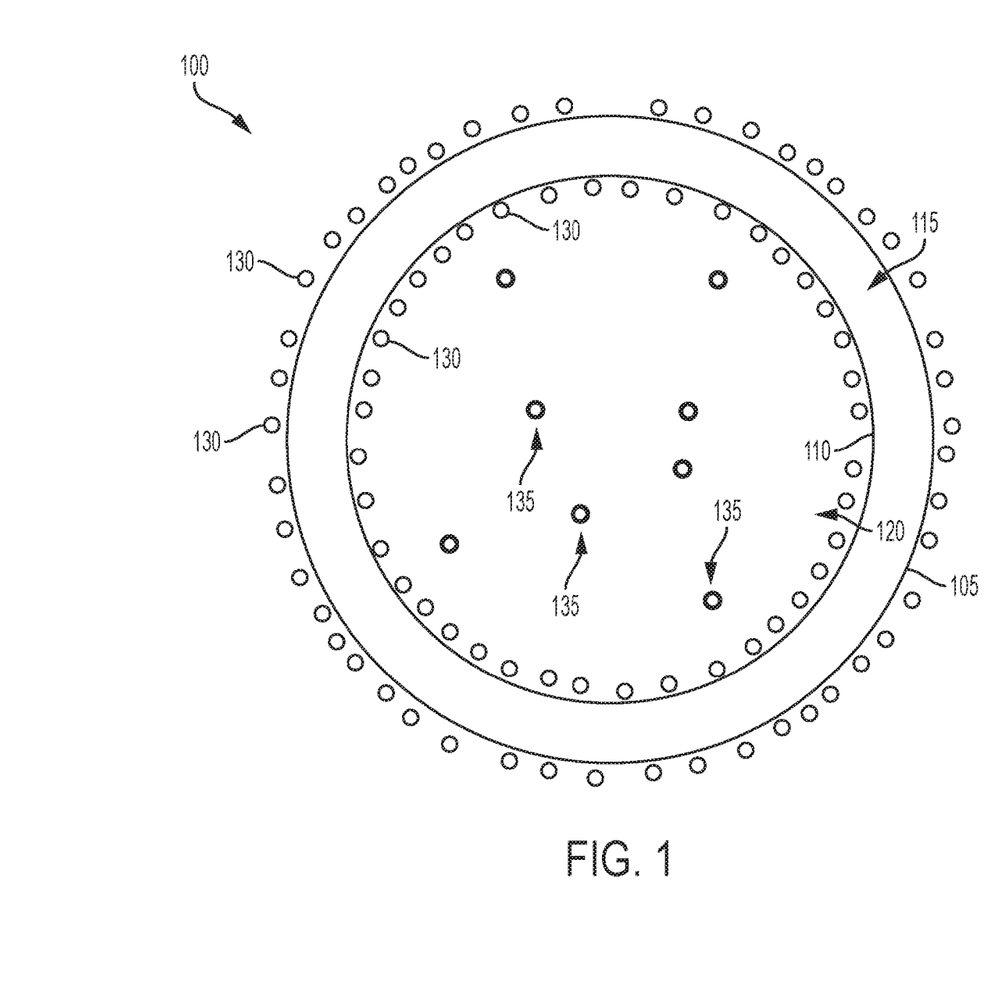
FIG. 1 shows an end view of a topological insulator nanotube configured for optical communication and electrical conductance, according to examples of the present disclosure.
Figure 2:
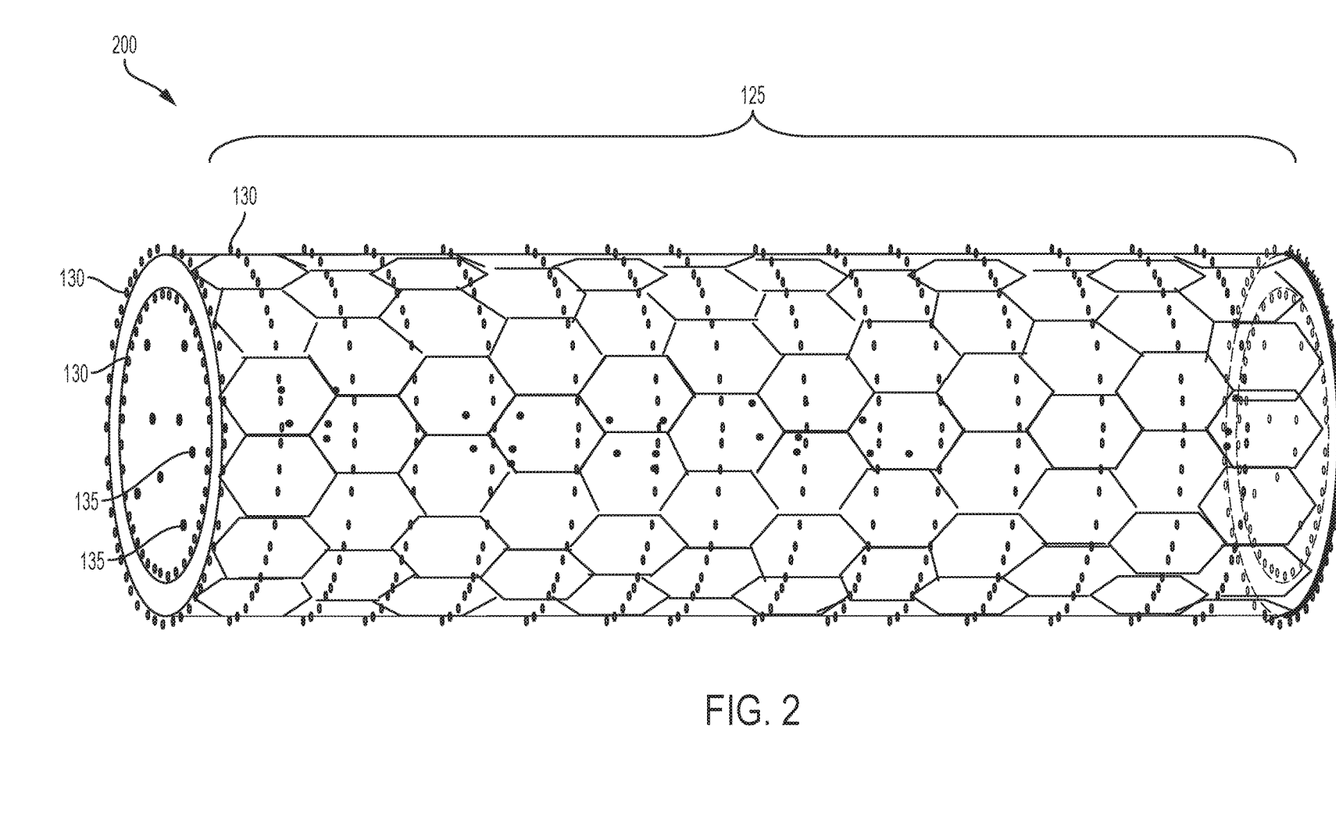
FIG. 2 shows a side-view of the topological insulator nanotube of FIG. 1.

FIG. 1 shows an end view 100 of a 3D non-carbon-based topological insulator nanotube configured for optical communication and electrical conductance, according to examples of the present disclosure. FIG. 2 shows a side-view 200 of the 3D non-carbon-based topological insulator nanotube of FIG. 1. The 3D non-carbon-based topological insulator can comprise materials including, but not limited to, $Bi_2Se_3$, BiSb ($Bi_{1-x}Sb_x$), BiTe, $Sb_2Te_3$, HgTe, and CdTe. The materials can be doped with dopants including, but not limited to, metals like Cu, semiconductors like Ge or Si, or insulators like O. The 3D non-carbon-based topological insulator is shaped into a nanotube arrangement using known techniques including by chemical processes of selective growth and etching techniques, i.e., isotropic etching, or by micromechanical systems that can take one edge of a film of the 3D non-carbon-based topological insulator and fold it over an opposite edge by application of electric fields. The edges can be affixed to each of using various processes known in the art. Another approach is by laser etching of a 3D non-carbon-based TI material. Generally, manufacturing technologies fall into two categories, chemical or mechanical. Chemical techniques include adding reactive elements such as hydrogen or sodium into the mixture, so that some percentage of the flat layers roll over onto themselves, with a final chemical process to select the tubes out. Mechanical processes include applying a force, such as an electric field (or voltage) so that the included charges will cause the flat sections to roll over onto themselves forming the tubes. A third approach can comprise using a laser to etch the nanotube out of a 3D non-carbon-based topological insulator. The 3D non-carbon-based topological insulator nanotube can provide electrical power of about 100 mW and optical data rates of about 0.1 to about 1 Gb/s at the same time. Other suitable material(s), doped or undoped, can also be used for the 3D non-carbon-based topological insulator that provide similar optical and electrical properties disclosed herein. In some examples, the TI nanotube can have an interior diameter that is about three to about six times the wall thickness. In one example, the TI nanotube can have a wall thickness about 10 nm and an interior diameter of about 30 nm. In another example, the TI nanotube can have a wall thickness about 200 nm and an interior diameter of about 2400 nm.

The 3D non-carbon-based topological insulator nanotube has an external surface 105 and an interior surface 110 that defines a wall thickness 115 and creates a hollow interior portion 120. The wall thickness 115 can be about 10 nm to about 200 nm. The diameter of the hollow interior portion 120 can be about 50 nm to about 500 nm. The 3D non-carbon-based topological insulator nanotube has a length 125 can be about 500 microns to about 1 cm. Electrons 130 conduct down the external surface 105 and the interior surface 110 of the 3D non-carbon-based topological insulator nanotube using the "skin effect," such that resistance is extremely low using electrons both inside and outside of the topological insulator nanotube. Single molecule topological insulator thickness helps prevent resistance from electrons colliding into topological insulator atoms. Light 135, e.g., photons, travel down the hollow interior portion 120 the 3D non-carbon-based topological insulator nanotube by index induced reflection from the interior surface 110. The diameter of the topological insulator nanotube and wavelength of light governs the internal index of refraction. The refractive index of the topological insulator is about 1.8 to about 2.5, which provide optical propagation along the length 125 through total internal reflection.

Figure 3:
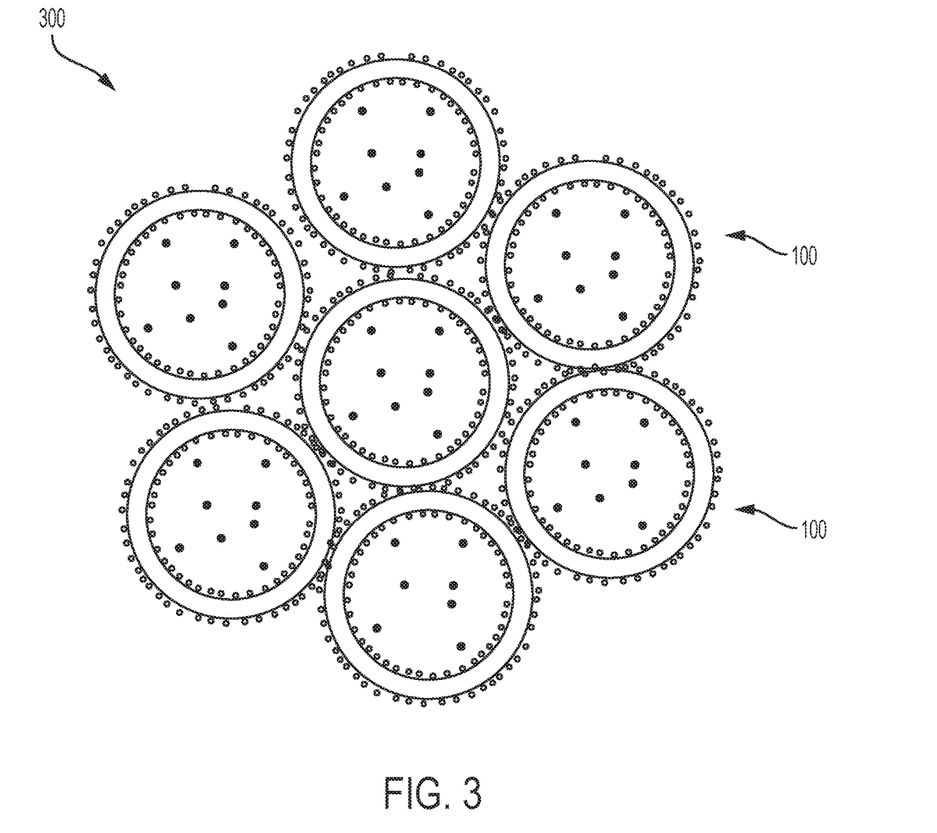
FIG. 3 shows an end view of a multiple topological insulator nanotubes for optical communication and electrical conductance, according to examples of the present disclosure.

More than one 3D non-carbon-based topological insulator nanotube can be grouped together in a "bundle" of cabling. By "bundle" it is meant that two or more lengths of 3D non-carbon-based topological insulator nanotubes are in direct contact along their lengths or are spaced apart by about less than one diameter of one nanotube from another. In propagating in this manner, there is a small evanescent wave that "leaks" through the outside of the tube. By coupling another medium close by, as in this bundling, you can "pick up" the evanescent wave and have it propagate in the other tube(s). FIG. 3 shows an end view 300 of a multiple 3D non-carbon-based topological insulator nanotubes for optical communication and electrical conductance, according to examples of the present disclosure. In FIG. 3, seven 3D non-carbon-based topological insulator nanotubes are shown bundled together; however this number is merely one non-limiting example. The bundle can include as few as two or more than seven combined together. The number of nanotubes can vary depending on application. For example, more nanotubes provides for easier propagation, but can increase complexity in manufacturing. Each 3D non-carbon-based topological insulator nanotube is the 3D non-carbon-based topological insulator nanotube of FIGS. 1 and 2.

Figure 4:
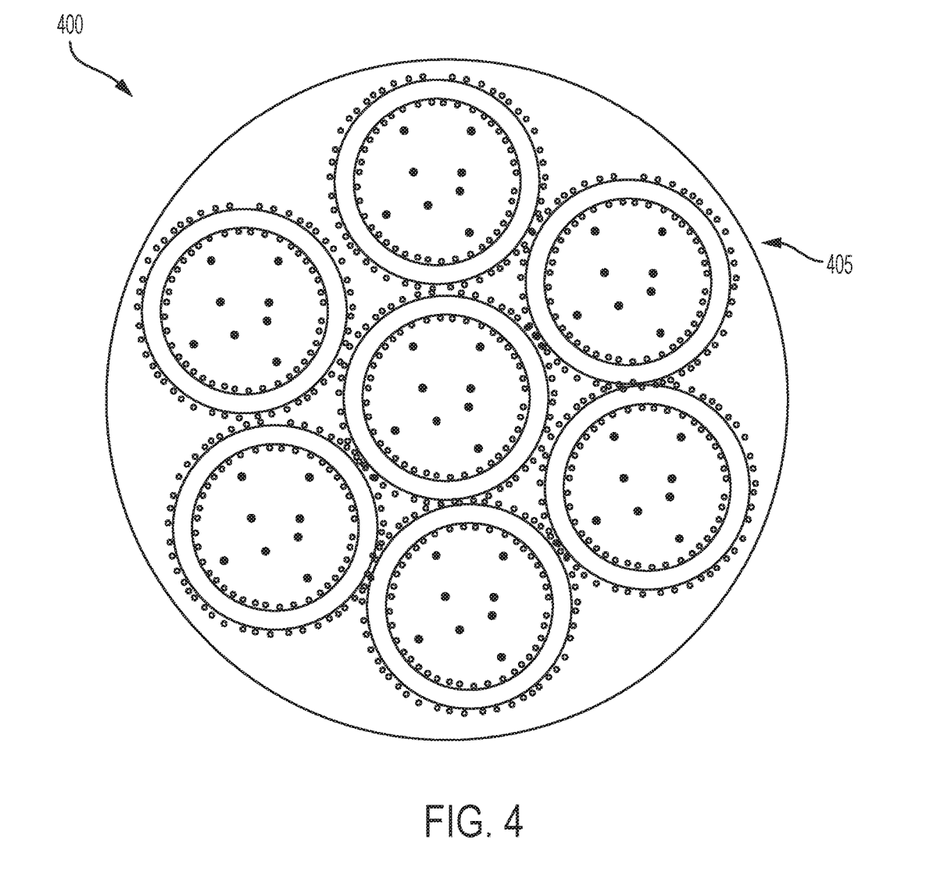
FIG. 4 shows an end view of a multiple topological insulator nanotubes for optical communication and electrical conductance, according to examples of the present disclosure.
Figure 5:
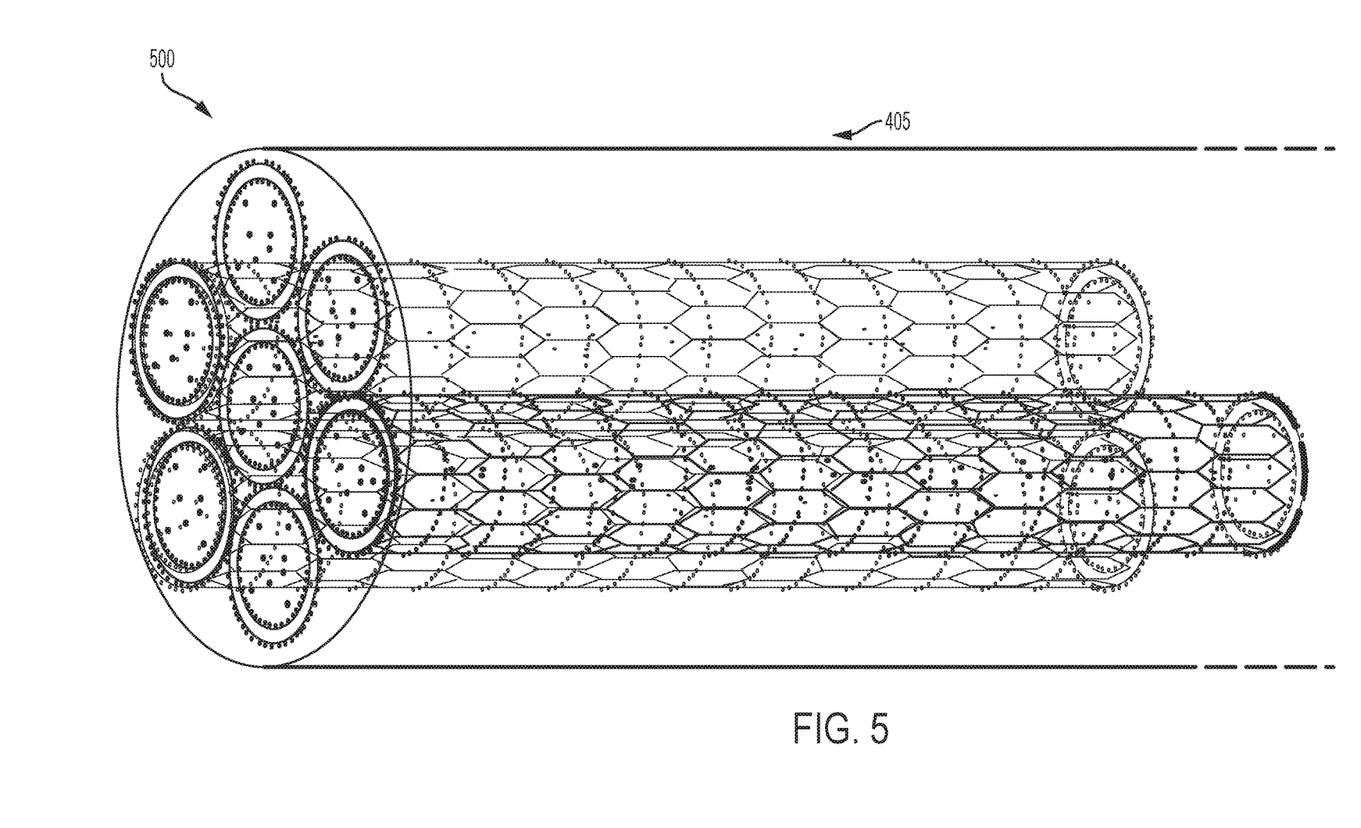
FIG. 5 shows a side perspective view of FIG. 4.

The bundle of FIG. 3 can be enclosed by an insulation cladding. FIG. 4 shows an end view 400 of multiple 3D non-carbon-based topological insulator nanotubes for optical communication and electrical conductance, according to examples of the present disclosure. FIG. 5 shows a side perspective view 500 of FIG. 4, with only one nanotube highlighted in profile. Two or more topological insulator nanotubes can be combined together surrounded by an insulation cladding 405. The insulation cladding 405 can be composed of known insulating materials including, but are not limited to, plastic, rubber, as well as similar materials that make up the TI. Each topological insulator nanotube is the topological insulator nanotube of FIG. 1. Although FIG. 4 shows seven topological insulator nanotubes, this is merely one example of such a combination. Other combinations of two or more topological insulator nanotubes can be combined. Each topological insulator nanotube can be individually insulated so multiple electrical signals can be transmitted simultaneously or various different power sources and return paths can be provided. One alternative to this example is to allow all of the external tube surfaces to touch, thus creating a single return path or ground, while each of the internal tube surfaces can act as a separate forward path for either power or as individual communications channels.

Figure 6:
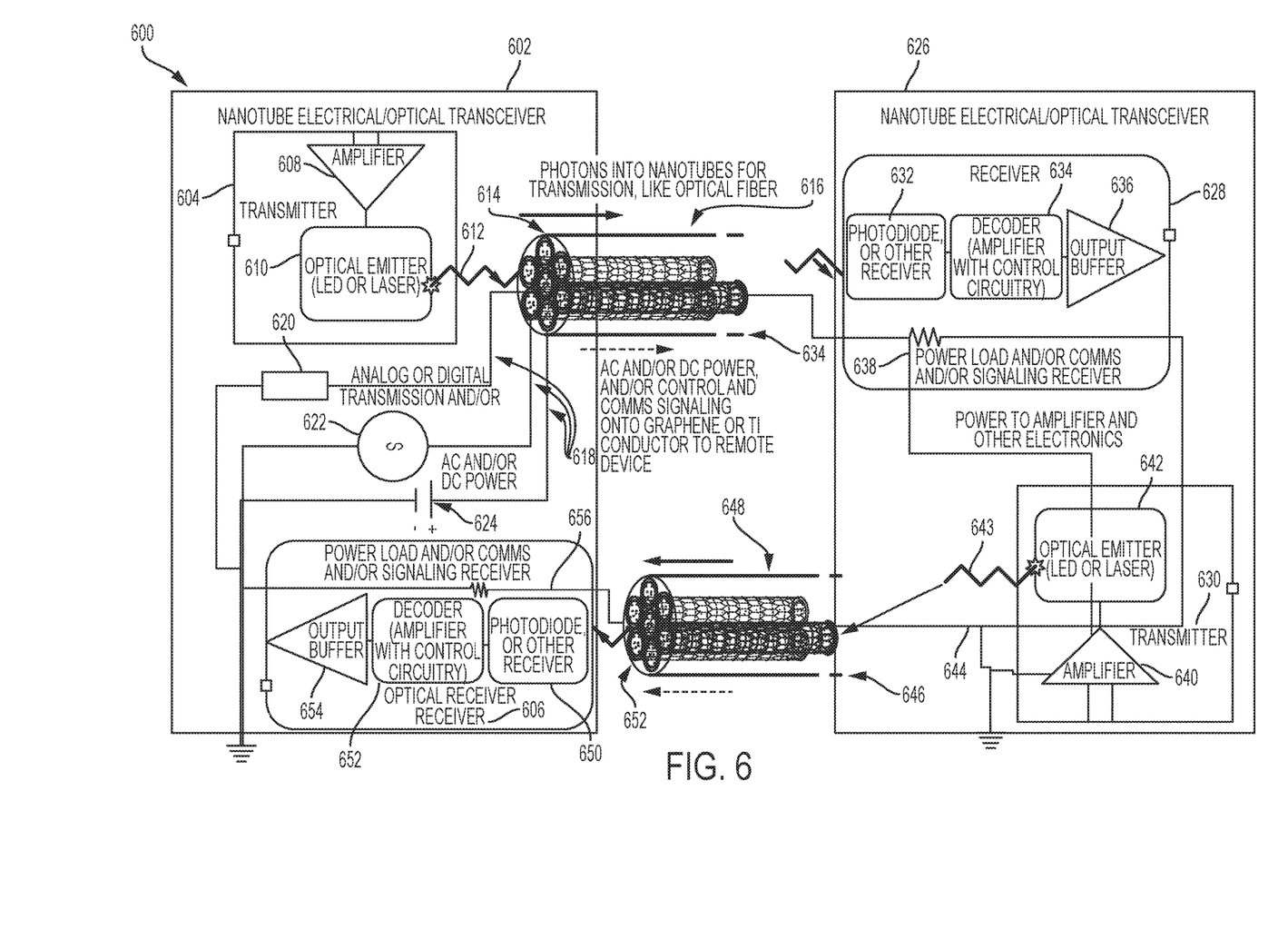
FIG. 6 shows a topological insulator nanotube transceiver relay system 600, according to examples of the present disclosure.

FIG. 6 shows a 3D non-carbon-based topological insulator nanotube transceiver relay system 600, according to examples of the present disclosure. A first electrical/optical transceiver 602 comprises transmitter 604 and receiver 606. Transmitter 604 comprises amplifier 608 and optical emitter 610, i.e., LED or laser. Optical emitter 610 provides an optical signal 612 to an internal portion of a first end 614 of a first 3D non-carbon-based topological insulator nanotube 616, e.g., the 3D non-carbon-based topological insulator nanotube shown in FIGS. 1-5. An electrical signal 618 can be provided to an external and/or internal surface of the wall of the first end 614 of the 3D non-carbon-based topological insulator nanotube by analog or digital transmission 620, AC power supply 622, or DC power supply 624. A second electrical/optical transceiver 626 comprises receiver 628 and transmitter 630. Receiver 628 comprises a photodiode 632 (or other receiver) that receives the optical signal 612 from a second end 634 of the first 3D non-carbon-based topological insulator nanotube 616. The detected optical signal is provided from the photodiode 632 to a decoder 634, which can comprise an amplifier with control circuitry, and to an output buffer 636. The electrical signal 618 is provided to a load 638.

The transmitter 630 comprises an amplifier 640 and an optical emitter 642, i.e., LED or laser. The electrical signal 618 or another electrical signal 644 can be amplified by amplifier 640 and provided to an external and/or internal surface of the wall of a first end 646 of a second 3D non-carbon-based topological insulator nanotube 648, e.g., the 3D non-carbon-based topological insulator nanotube shown in FIGS. 1-5. Optical signal 643 is provided to an internal portion of a first end 646 of the second 3D non-carbon-based topological insulator nanotube 648. Receiver 606 comprises a photodiode 650 (or other receiver) that receives the optical signal 643 from a second end 652 of the first 3D non-carbon-based topological insulator nanotube 616. The detected optical signal is provided from the photodiode 650 to a decoder 652, which can comprise an amplifier with control circuitry, and to an output buffer 654. The electrical signal 618, 644 is provided to a load 656.

The 3D non-carbon-based topological insulator nanotube shown in FIGS. 1-5 can provide for a current flow along the length of the nanotube by the Hall Effect. The Hall Effect is the production of a voltage difference (the Hall voltage) across an electrical conductor, transverse to an electric current in the conductor and a magnetic field perpendicular to the current. The Hall coefficient is defined as the ratio of the induced electric field to the product of the current density and the applied magnetic field. It is a characteristic of the material from which the conductor is made, since its value depends on the type, number, and properties of the charge carriers that constitute the current.

Figure 7:
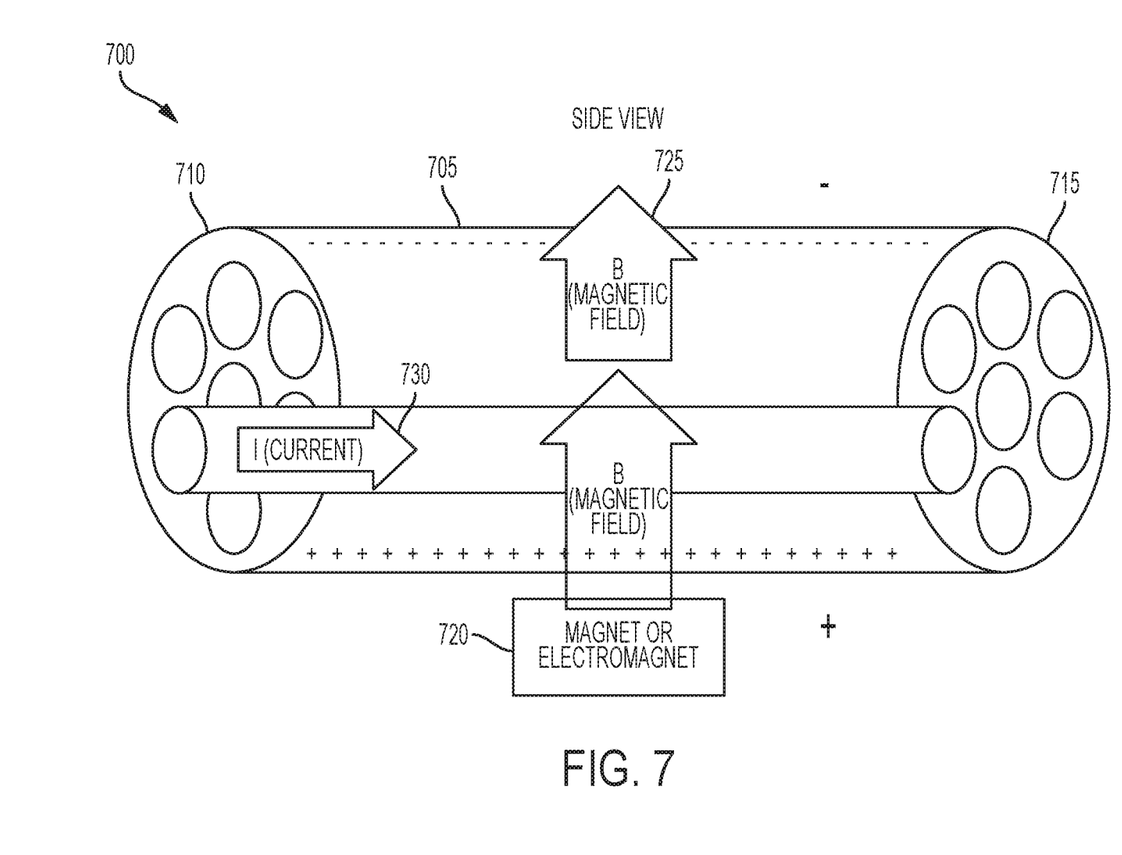
FIG. 7 shows a side view 700 of a 3D non-carbon-based topological insulator nanotube in an external magnetic field, according to examples of the present disclosure.

FIG. 7 shows a side view 700 of a 3D non-carbon-based topological insulator nanotube in an external magnetic field, according to examples of the present disclosure. 3D non-carbon-based topological insulator nanotube 705 comprises a length having a first end 710 and a second end 715. A magnet or electromagnet 720 produces a magnetic field 725 in a direction indicated by the directional arrows in the figure, e.g., moving from the bottom of the figure to the top of the figure, that is orthogonal to a longitudinal axis of the nanotube, e.g., along the long axis of the nanotube. Due to the magnetic field 725 and the properties of the topological insulator, a current 730 is induced to flow along the length of the external and/or internal surfaces of the nanotube in the direction indicated by the directional arrow, e.g., moving from left to right in the figure. The Hall Effect causes a magnetic field to be created, pushing the electrons to one side of a conductive surface of the nanotube. The differential voltage created across the nanotube can be amplified, e.g., by amplifier 608, 640 and used to power the first electrical/optical transceiver 602 and/or the second electrical optical transceiver 626.

Figure 8:
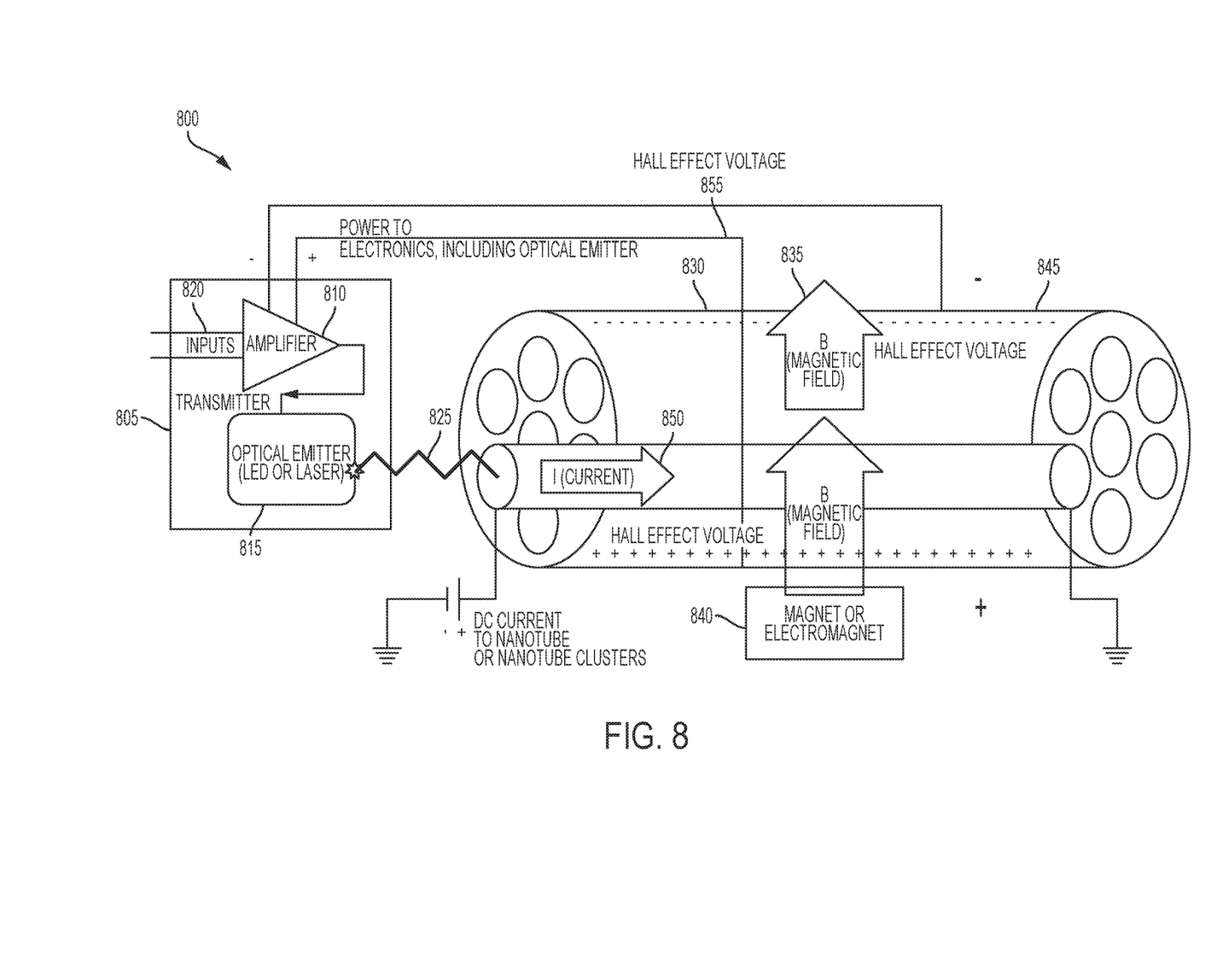
FIG. 8 shows an optical transmitter with Hall Effect power 800 that can, if differential voltage is used and amplified in a transmitter, can power an emitter such as an LED or a laser to propagate photons through the nanotubes, according to examples of the present disclosure.

FIG. 8 shows an optical transmitter with Hall Effect power 800 that can, if differential voltage is used and amplified in a transmitter, can power an emitter such as an LED or a laser to propagate photons through the nanotubes, according to examples of the present disclosure. Transmitter 805, such as transmitter 604, 630, comprises an amplifier 810 and an optical emitter 815 (LED or laser). The amplifier 810 is supplied with power inputs 820 that are provided to the optical emitter 815. Optical emitter 815 provides an optical signal 825 to an internal portion of a 3D non-carbon-based topological insulator nanotube 830, such as the 3D non-carbon-based topological insulator nanotube as shown in FIGS. 1-5. The Hall Effect causes a magnetic field 835 to be created by a magnet or electromagnet 840, which pushes the electrons to one side 845 of the nanotube 830 and induces a current 850 to flow on the exterior and/or interior surfaces and along the length of the nanotube 830. The direction of the magnetic field 835 and the induced current 850 is the same as in FIG. 7. The Hall Effect voltage 855 can then be returned to the amplifier 810.

Figure 9:
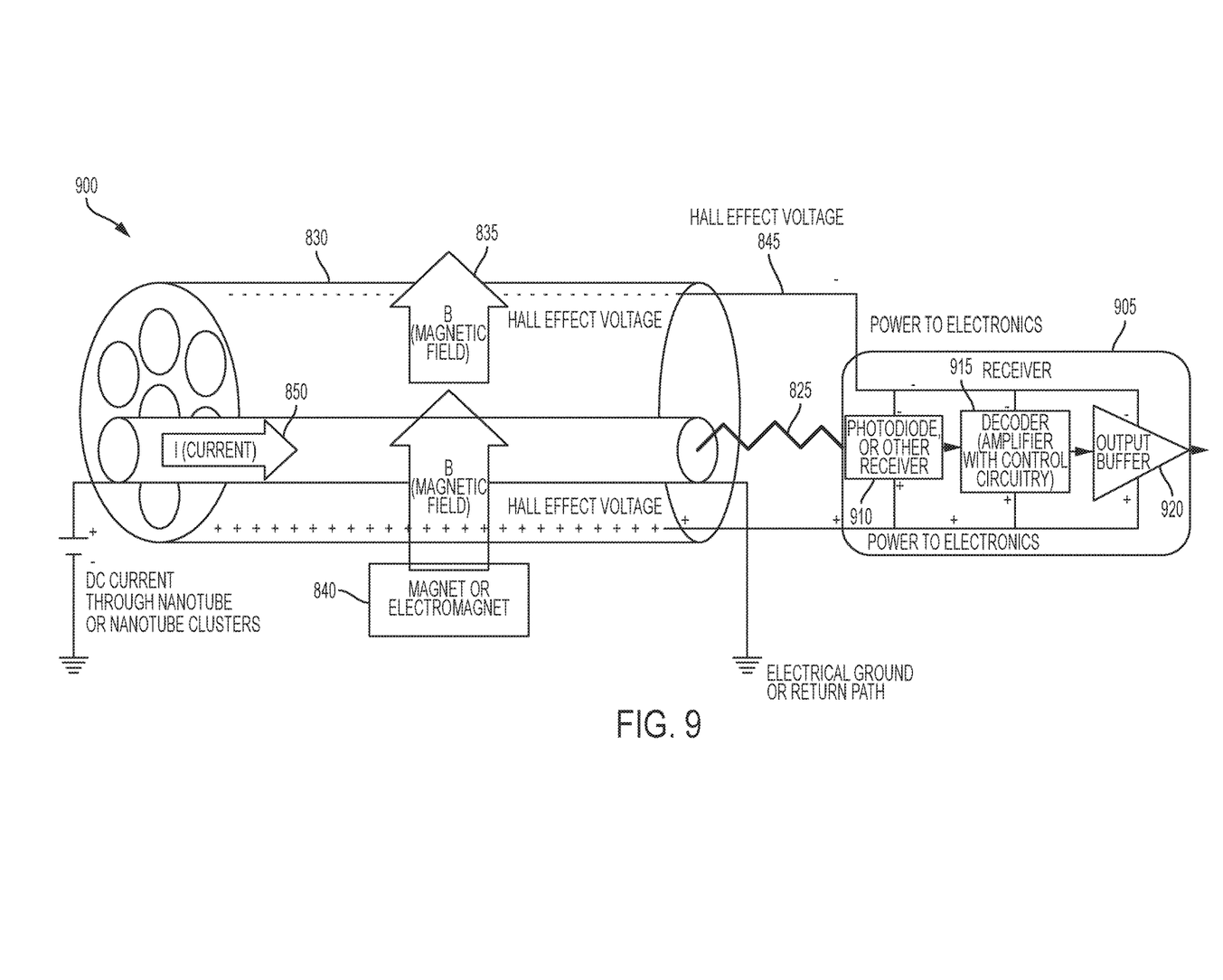
FIG. 9 shows an optical receiver with Hall Effect remote power 900, according to examples of the present disclosure.

FIG. 9 shows an optical receiver with Hall Effect remote power 900, according to examples of the present disclosure. FIG. 9 shows the receiver portion of FIG. 8. An optical receiver 905 reproduces the message from the transmitter's optical signal 825. Using a photodiode 910, the photons can be collected and decoded (based on the optical frequency, control circuitry is used to decode the message) by a decoder 915. Once decoded, the signal is buffered by an output buffer 920.

Figure 10:
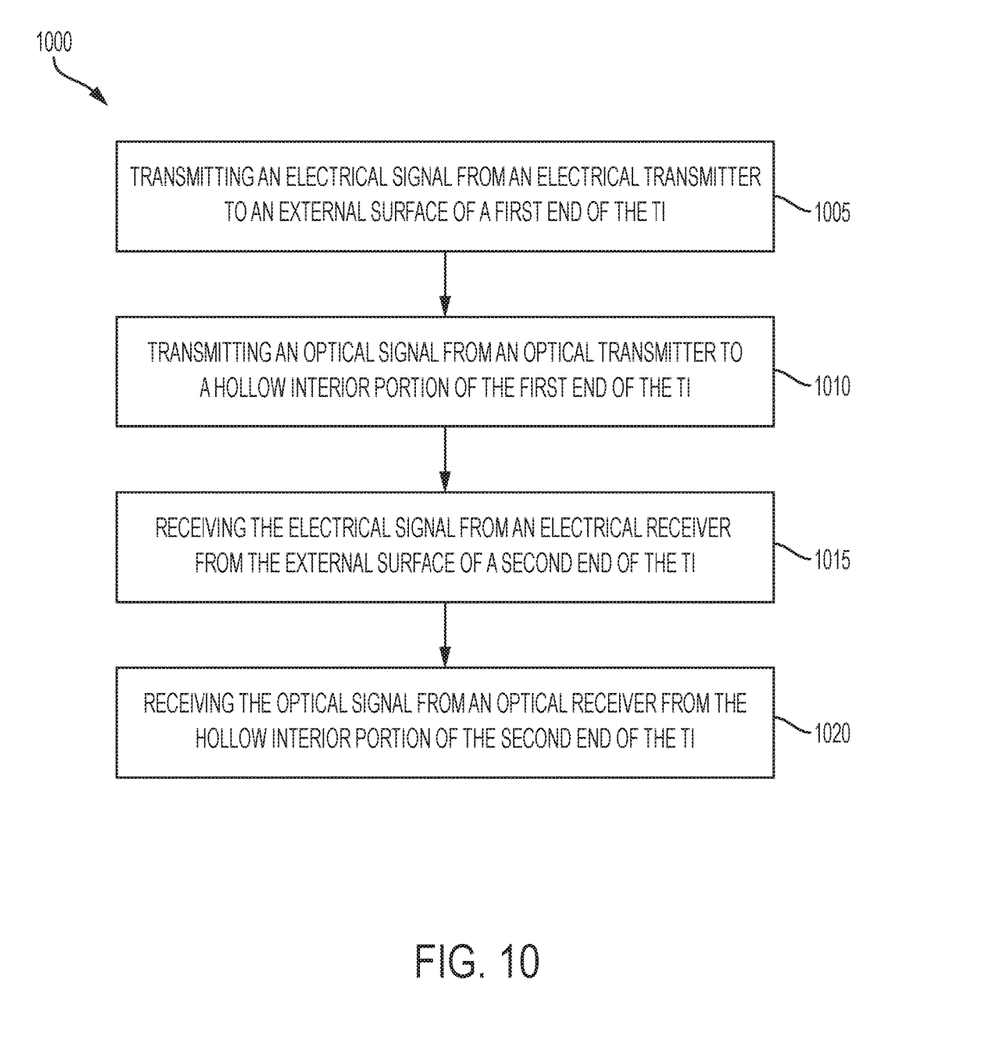
FIG. 10 shows a method 1000 for providing electrical and optical interconnection using a 3D non-carbon-based topological insulator (TI), according to examples of the present disclosure.

FIG. 10 shows a method 1000 for providing electrical and optical interconnection using a 3D non-carbon-based topological insulator (TI), according to examples of the present disclosure. The 3D non-carbon-based TI has length and a tube shape having wall thickness of about 10 nm to about 200 nm and a hollow interior portion surrounded by an interior surface of the TI. The method comprises providing, at 1005, an electrical signal from an electrical transmitter to an external surface of a first end of the TI. The electrical signal is configured to propagate along the external surface of the TI to the second end. Generally, conductive materials will see the current primarily moving along the surface of the material, since according to Maxwell's equation require that the electric field to go to zero in a conductor. This is also true in a thin material such as a nanotube. The method continues by providing, at 1010, an optical signal from an optical transmitter to a hollow interior portion of the first end of the TI. The optical signal is configured to propagate in the hollow interior portion along the length to the second end by total internal reflection due to a refractive index of an interior surface of the TI. The method continues by obtaining, at 1015, the electrical signal from an electrical receiver from the external surface of a second end of the TI. The electrical signal in this place comes the same origin as the signal in total internal reflection. The electrical signal does not go to zero instantaneously at the end of the material, it just falls off very quickly. So, you can pick up the signal again with an adjacent nanotube. The method continues by obtaining, at 1020, the optical signal from an optical receiver from the hollow interior portion of the second end of the TI. The method can also comprise providing a magnetic field in a direction transverse to the length of the TI such that a current is produced along the external surface of the length of the TI that flows in a direction from the first end to the second end.

While the disclosure has been described with reference to the exemplary implementations thereof, those skilled in the art will be able to make various modifications to the described examples without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for providing electrical and optical interconnection using a 3D non-carbon-based topological insulator (TI), the system comprising:
a length (125) of the TI having a tube shape having wall thickness (115) of about 10 nm to about 200 nm and a hollow interior portion (120) surrounded by an interior surface (110) of the TI, wherein the length (125) comprises a first end and a second end, wherein the first end is configured to receive an optical signal, an electrical signal, or both, the optical signal configured to propagate in the hollow interior portion (120) along the length (125) to the second end by total internal reflection due to a refractive index of the interior surface of the TI, the electrical signal configured to propagate along an external surface (105) of the TI to the second end.

2. The system of claim 1, wherein the TI provides both electrical power levels of about 100 mW and optical data rates of about 0.1 to about 1 Gb/s at the same time.

3. The system of claim 1, wherein the TI comprises $Bi_2Se_3$, BiSb, BiTe, SbTe, HgTe, or CdTe.

4. The system of claim 1, further comprising an insulating cladding (405) surrounding the length of the TI.

5. The system of claim 4, wherein the insulating cladding (405) comprises $Bi_2Se_3$, BiSb, BiTe, SbTe, HgTe, or CdTe.

6. The system of claim 1, further comprising one or more additional lengths of non-carbon-based TI, each of which is surrounded by corresponding cladding.

7. The system of claim 6, further comprising another insulating cladding (405) surrounding the length and the one or more additional lengths.

8. The system of claim 1, further comprising a magnet (720) configured to provide a magnetic field in a direction transverse to the length of the TI such that a current is produced along the external surface of the length of the TI that flows in a direction from the first end to the second end.

9. The system of claim 1, further comprising a first electrical/optical transceiver (602) configured to provide the electrical signal, the optical signal, or both to the first end of the length of the TI.

10. The system of claim 9, further comprising a second electrical/optical transceiver (626) configured to receive the electrical signal, the optical signal, or both from the second end of the length of the TI.

11. A method for providing electrical and optical interconnection using a 3D non-carbon-based topological insulator (TI) having length and a tube shape having wall thickness of about 10 nm to about 200 nm and a hollow interior portion surrounded by an interior surface of the TI, the method comprising:

Transmitting (1005) an electrical signal from an electrical transmitter to an external surface of a first end of the TI;

transmitting (1010) an optical signal from an optical transmitter to a hollow interior portion of the first end of the TI;

receiving (1015) the electrical signal from an electrical receiver from the external surface of a second end of the TI; and receiving (1020) the optical signal from an optical receiver from the hollow interior portion of the second end of the TI, wherein the optical signal is configured to propagate in the hollow interior portion along the length to the second end by total internal reflection due to a refractive index of an interior surface of the TI and the electrical signal is configured to propagate along the external surface of the TI to the second end.

12. The method of claim 11, wherein the TI provides both electrical power levels of about 100 mW and optical data rates of about 0.1 to about 1 Gb/s at the same time.

13. The method of claim 11, wherein the TI comprises $Bi_2Se_3$, BiSb, BiTe, SbTe, HgTe, or CdTe.

14. The method of claim 11, wherein the TI further comprising an insulating cladding surrounding the length the TI.

15. The method of claim 14, wherein the insulating cladding comprises $Bi_2Se_3$, BiSb, BiTe, SbTe, HgTe, or CdTe.

16. The method of claim 11, further comprising applying a magnetic field in a direction transverse to the length of the TI such that a current is produced along the external surface of the length of the TI that flows in a direction from the first end to the second end.

17. A system comprising:
a first electrical/optical transceiver (602);
a second electrical/optical transceiver (626); and
a length (125) of 3D non-carbon-based topological insulator (TI) configured to connect the first transceiver and the second transceiver and configured to provide an electrical and optical interconnection between the first transceiver and the second transceiver,
wherein the TI provides both electrical power levels of about 100 mW and optical data rates of about 0.1 to about 1 Gb/s at the same time.

18. The system of claim 17, wherein the TI has a tube shape having wall thickness (115) of about 10 nm to about 200 nm and a hollow interior portion (120) surrounded by an interior surface (110) of the TI, wherein the length (125) comprises a first end and a second end, wherein the first end is configured to receive an optical signal, an electrical signal, or both, the optical signal from the first transceiver, wherein the optical signal is configured to propagate in the hollow interior portion (120) along the length (125) to the second end by total internal reflection due to a refractive index of the interior surface of the TI, the electrical signal configured to propagate along an external surface (105) of the TI to the second end.

19. The system of claim 17, wherein the TI comprises $Bi_2Se_3$, BiSb, BiTe, SbTe, HgTe, or CdTe.

* * * * *